May 16, 1950     F. M. SMITH ET AL     2,507,766
PRODUCTION OF ALKYL BENZENES
Filed June 9, 1947
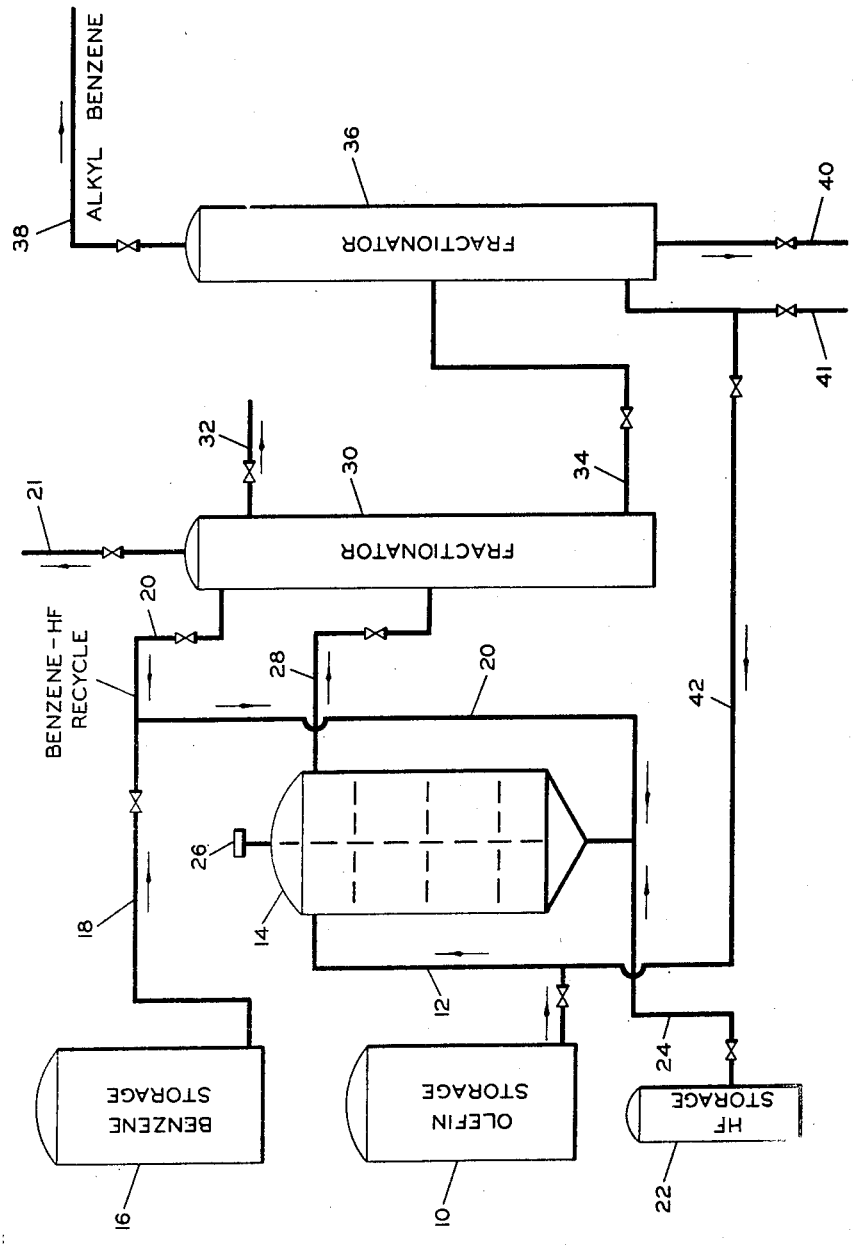
INVENTORS
F.M. SMITH
R.S. HANMER
BY
*Hudson and Young*
ATTORNEYS Patented May 16, 1950

2,507,766

UNITED STATES PATENT OFFICE 2,507,766

PRODUCTION OF ALKYL BENZENES

Fredrick M. Smith and Robert S. Hanmer, Bartlesville, Okla., assignors to Phillips Petroleum Company, a corporation of Delaware Application June 9, 1947, Serial No. 753,562

2 Claims. (Cl. 260—671)

This invention relates to an improved process for the production of high molecular weight alkyl aromatics. One embodiment of this invention relates to an improved process for the alkylation of aromatic hydrocarbons with high molecular weight olefins in the presence of hydrogen fluoride as catalyst. In one specific embodiment this invention relates to the alkylation of benzene with high molecular weight straight- and branched-chain olefins in the presence of a hydrogen fluoride catalyst wherein increased yields of useful alkylate and lower catalyst consumption are achieved through improvements in separation of catalyst from the reaction effluent.

According to one prior method an aromatic hydrocarbon and an olefin concentrate alkylating reactant are agitated with a liquid type catalyst such as hydrogen fluoride under conditions suitable for the condensation of the olefins present in the concentrate with the aromatic hydrocarbon contained therein. The alkylation effluent is passed to a separating chamber where it is divided into catalyst and hydrocarbon phases by gravity, the heavier catalyst phase being returned to the alkylation zone and the hydrocarbon phase discharged for fractionation.

While this method of operation has numerous advantages, difficulties are encountered in the process as a result of the formation of catalyst-soluble products which remain in the catalyst phase. These catalyst-soluble products apparently result largely from the polymerization of olefins, a reaction which is activated by the alkylation catalyst. The olefin polymers combine with the catalyst to form compositions or complexes in which other hydrocarbons, including alkyl aromatics and unalkylated aromatics, are soluble. The element of time is significant in the formation of these catalyst-soluble products, the amount of hydrocarbon so combined being increased with extension in the length of time of contact with the catalyst. The extent of formation of these products is often very large, their volume sometimes exceeding that of useful alkylate produced. Thus a large amount of hydrocarbon otherwise utilizable builds up in the catalyst phase and must be removed from the system continuously to prevent excessive catalyst dilution. Furthermore, when so operating, large volumes of catalyst are required, the amount often being equal to that of the hydrocarbon in the feed.

We have now discovered a process for the production of alkyl aromatics from aromatic hydrocarbons and high molecular weight olefins in the presence of a hydrogen fluoride catalyst wherein losses from the formation of catalyst soluble products are eliminated or substantially reduced and much smaller quantities of catalyst are required. According to the method of our invention the alkylation effluent is discharged from the alkylation zone directly to the fractionation zone. Here the catalyst, together with unreacted aromatic hydrocarbons, is removed overhead for recycle to the alkylation zone. By operating in this manner, catalyst-soluble products remain in the higher-boiling fraction and as the stream is further fractionated are separated in a manner such that alkyl aromatics previously held in the catalyst phase are discharged as product while higher boiling olefin polymers and polyalkyl aromatics remain as bottoms. These bottoms products can be utilized by recycling to the alkylation zone where conditions favor depolymerization of the polymers and side-chain transfer from the polyalkyl aromatics to unalkylated aromatic hydrocarbons, thus effecting a high degree of utilization of products formerly held in the catalyst phase and removed as waste in the catalyst regeneration.

One object of this invention is to provide an improved process for the production of alkyl aromatics.

Another object of this invention is the alkylation of aromatic hydrocarbons with high molecular weight olefins in the presence of hydrogen fluoride catalyst.

Still another object is to substantially reduce the formation of catalyst-soluble products formed in alkylation of aromatic hydrocarbons with high molecular weight olefins.

Still another object is to substantially reduce catalyst consumption in the alkylation of aromatic hydrocarbons with high molecular weight olefins.

Another object is to provide an improved process for the production of alkyl benzenes suitable for use as detergent intermediates.

A specific object of this invention is to provide an improved catalytic process for alkylating benzene with olefins containing at least seven and not more than eighteen carbon atoms to the molecule.

Other objects and advantages of this invention will be apparent to those skilled in the art from the accompanying discussion and description.

One advantage of the present process lies in the small quantity of catalyst required, the amount usually being between ten and thirty volume per cent of the reaction mixture as contrasted with the fifty volume per cent generally necessary in processes employing gravity separation methods. This lowering in catalyst volume is made possible by the method of our process wherein the catalyst is constantly maintained in a high state of activity, no catalyst-soluble products being returned to the alkylation zone in the recycle. Another advantage of our invention lies in the elimination of expensive catalyst regeneration for removal of catalyst soluble products. A further advantage lies in the high degree of utilization of products formerly lost as waste or at best convertible to useful products only after expensive processing. A still further advantage of our process lies in the immediate and complete separation of the catalyst after the alkylation, thus reducing the contact time to a minimum and thereby correspondingly reducing the formation of catalyst soluble products.

These and other advantages of our invention will be apparent from a description of the accompanying drawing in which is shown a diagrammatic illustration of one specific embodiment of the process. Specific materials are mentioned, not as limiting to the scope of the disclosure, but in the interest of clarity in explanation. Referring to the drawing, a high molecular weight olefinic material, which may preferably be an olefin concentrate which also contains other hydrocarbons as well, is passed from storage 10 through line 12 to alkylation zone 14 where it is mixed with benzene which is drawn from storage 16 through line 18 and/or from recycle line 20 and hydrogen fluoride catalyst which is drawn from storage 22 through line 24 and/or contained in the recycle stream from line 20. The reaction mixture is agitated by mechanical stirrer 26 while conditions in the alkylation zone are maintained to give a high degree of conversion of olefin to alkyl benzenes. From the alkylation zone 14 the effluent is discharged through line 28 to fractionator 30, which should be lined with an acid resistant material, such as "Monel" metal, where hydrogen fluoride and unreacted benzene are removed overhead for recycle to the alkylation zone through line 20. If desired, low-boiling material and/or at least a portion of said hydrogen fluoride and benzene may be removed from the system through line 21. Hydrocarbons boiling above benzene and below the alkyl benzenes which may be present in the alkylation zone effluent are removed through line 32 for storage or utilization elsewhere. Such hydrocarbons may be contained in the olefin concentrate introduced through line 12. The kettle product is passed through line 34 to fractionator 36, which will preferably be operated at reduced pressure. Here a fraction boiling in the range 500 to 700° F. (corrected to atmospheric pressure), and comprising a mixture of mono alkyl benzenes valuable for use as detergent intermediates, is removed via line 38. The high-boiling olefin polymers and polyalkyl benzenes may be recycled to the alkylation zone through lines 42 and 12 or may be discharged from the system through line 41 if desired. When this material is recycled, we have found that substantial recovery of useful material is possible since under the conditions maintained in the reactor, the olefin polymers tend to depolymerize to supply olefins utilizable in the alkylation reaction and dealkylation of certain polyalkyl benzenes is effected with transfer of side-chain groups to benzene to provide alkyl benzenes boiling in the desired range. Highly refractory material may be withdrawn from fractionator 36 through line 40.

In the accompanying diagrammatic drawing reference to some of the equipment such as pumps, gauges, and other equipment which obviously would be necessary to actually operate the process have been intentionally omitted. Only sufficient equipment has been shown to illustrate the process of the invention and it is intended that no undue limitation be read into this invention by reference to the drawing and discussion thereof.

The catalyst to be employed in the process of our invention is hydrogen fluoride, either in substantially anhydrous form or in aqueous solutions of 50 per cent or higher concentration. The quantity used may be as low as ten per cent of the total volume of the reaction mixture although optimum results will generally be obtained with slightly larger amounts, say from 15 to 30 per cent. Larger amounts may be employed when desired.

The olefins to be employed in the process of our invention contain at least seven and not more than eighteen carbon atoms to the molecule and may conveniently be supplied as olefin concentrates. Convenient and economical sources of such concentrates lie in selected fractions of cracked petroleum naphthas which come within a boiling range between 200 and 600° F.; for example, a cracked naphtha from a "Cycloversion" process may be employed, such as is described in the Oil and Gas Journal, April 13, 1944 by Schulze et al. A thermally cracked naphtha may be employed if desired.

Temperatures in the alkylation zone should generally be in a range between about 60 and about 120° F., but preferably between 75 and 100° F. The reaction can be effected without the use of superatmospheric pressures, but it is generally desirable to apply sufficient pressure to avoid vaporization of the catalyst. For example, from 30 to 50 pounds per square inch gauge is satisfactory. The mol ratio of aromatic to olefin entering the alkylation zone should be between 2:1 and 15:1, but preferably from 5:1 to 10:1. The rate of flow of the reaction mixture is such that the residence time in the alkylation zone is in the range of about 5 to about 60 minutes, however a range of 15 to 45 minutes is preferable.

The process of our invention is applicable to the alkylation of benzene, toluene, the xylenes, and the like, but it is particularly adaptable to the alkylation of benzene with high molecular weight olefins. In some instances, the use of selected fractions of highly aromatic petroleum naphtha may be employed as a source of alkylatable aromatic hydrocarbons.

*Example I*

An olefin feed stock boiling from 400 to 456° F. was prepared by fractionating a naphtha made by thermally cracking a topped crude. Analysis of said feed showed an olefin content of 30 per cent and aromatic constitutents amounting to 16 per cent. The olefinic stock was fed to two reactors where it was combined with benzene in a ratio of 1 mol of olefin to 8 mols of benzene. The hydrogen fluoride catalyst was added to both reactors. In the first reactor, hereinafter designated as reactor A, the catalyst was added to an extent of 24 per cent of the total volume. In the second reactor, designated as reactor B, the catalyst was added to an extent of 50 per cent of the total volume.

Substantially the same reaction conditions were maintained in the two reactors, the temperatures being 90° F., pressures, 30 pounds per square inch gauge, and flow rates such that a contact time of 30 minutes was obtained. The effluent from reactor A was discharged to a fractionating column where unreacted benzene and catalyst were separated for recycling to the reaction. From reactor B the effluent was passed to a separator where it was divided into catalyst and hydrocarbon phases by gravity, the hydrocarbon being conveyed to a fractionation system and the catalyst phase recycled to the alkylation reactor.

Results are tabulated below.

| Reaction Products | Pounds per Pound of Olefin Fed to Reactor | |
| --- | --- | --- |
| | A | B |
| Light alkylate (B. P. 500–700° F.) | 1.023 | 0.809 |
| Total alkylate | 1.129 | 1.03 |
| Catalyst soluble oil | | 0.385 |

*Example II*

Example I was repeated using as the olefinic feed stock a fraction of a catalytically cracked naphtha made by the "Cycloversion" process, mentioned above, boiling between 398 and 445° F., in which the olefin content was 16 per cent, and aromatic constituents were 31 per cent. Reaction conditions and procedure were substantially the same as in the preceding example. The amount of catalyst in reactor A was 26 per cent of the total volume while the amount of catalyst used in reactor B was 51 per cent of the total volume.

Results are tabulated below.

| Reaction Products | Pounds per Pound of Olefin Fed to Reactor | |
| --- | --- | --- |
| | A | B |
| Light alkylate (B. P. 500–700° F.) | 0.972 | 0.421 |
| Total alkylate | 1.154 | 0.796 |
| Catalyst soluble oil | | 0.762 |

It is to be understood that this invention should not be unnecessarily limited to the above discussion and description and that modifications and variations may be made without departing substantially from the invention or from the scope of the claims.

We claim:

1. An improved process for catalytically producing high molecular weight alkyl benzenes, which comprises mixing alkylatable benzene hydrocarbons and olefin-bearing material containing olefins having at least seven and not more than eighteen carbon atoms per molecule with hydrogen fluoride in an alkylation zone; maintaining a temperature in said alkylation zone in the range of about 60 to about 120° F.; maintaining a pressure in said alkylation zone sufficient to prevent vaporization of said hydrogen fluoride; maintaining the rate of feed of said olefin-bearing material and said benzene hydrocarbons such that the residence time in said alkylation zone is in the range of about 5 to about 60 minutes; maintaining a mol ratio of said benzene hydrocarbons to said olefin entering said alkylation zone in the range of about 15:1 to about 2:1; introducing the entire effluent reaction mixture which contains polymers of said olefins having at least 7 carbon atoms per molecule which normally are dissolved in said hydrogen fluoride as well as undesired polyalkyl aromatics from said alkylation zone to a fractionation zone, removing from the upper portion of said fractionation zone a single fraction comprising hydrogen fluoride and unreacted benzene hydrocarbons, and recycling at least a portion of said hydrogen fluoride and unreacted benzene hydrocarbons fraction to said alkylation zone; removing from an intermediate portion of said fractionation zone hydrocarbon material boiling above said unreacted benzene hydrocarbons and boiling below the alkyl benzene-bearing material, introducing the remaining higher boiling alkyl benzene-bearing material from said fractionation zone to another fractionation zone, removing an alkyl benzene fraction from said higher-boiling alkyl benzene-bearing material, and recycling at least a portion of the remaining higher-boiling material which contains the said polymers of said olefins and said undesired polyalkyl aromatics to said alkylation zone wherein depolymerization of said polymers of said olefins and side-chain transfer from the said undesired polyalkyl aromatics resulting in desirable alkylation of benzene by the depolymerized olefins and the side-chains from the undesired polyalkyl benzenes is caused to occur simultaneously with the alkylation in said alkylation zone of the benzene by said olefins having at least 7 carbon atoms per molecule.

2. An improved process for catalytically producing high molecular weight alkyl benzenes, which comprises mixing benzene and olefin-containing material obtained from a cracked naphtha having a boiling range of 200 to 600° F. with hydrogen fluoride in an alkylation zone; maintaining a temperature in said alkylation zone in the range of about 60 to about 120° F.; maintaining a pressure in said alkylation zone sufficient to prevent vaporization of said hydrogen fluoride catalyst; maintaining the rate of feed of olefin-bearing material and benzene such that the residence time in said alkylation zone be in the range of about 5 to about 60 minutes; maintaining a mol ratio of benzene to olefin entering said alkylation zone in the range of about 15:1 to about 5:1; introducing the entire effluent reaction mixture which contains polymers of said olefins having at least 7 carbon atoms per molecule which normally are dissolved in said hydrogen fluoride as well as undesired polyalkyl aromatics from said alkylation zone to a fractionation zone, removing from upper portion of said fractionation zone a single fraction comprising hydrogen fluoride and unreacted benzene, and recycling at least a portion of said hydrogen fluoride and unreacted benzene fraction to said alkylation zone, removing from an intermediate portion of said fractionating zone hydrocarbon material associated with the original olefin-bearing material, introducing the resulting high boiling hydrocarbon material into a second fractionation zone and removing alkyl benzenes from said high boiling hydrocarbon material and recycling at least a portion of the resulting higher boiling hydrocarbon material which contains the said polymers of said olefins and said undesired polyalkyl aromatics to the alkylation zone wherein depolymerization of said polymers of said olefins and side-chain transfer from the said undesired polyalkyl aromatics resulting in desirable alkylation of benzene by the depolymerized olefins and the side-chains from the undesired polyalkyl benzenes is caused to occur simultaneously with the alkylation in said alkylation zone of the benzene by said olefins having at least 7 carbon atoms per molecule.

FREDRICK M. SMITH.
ROBERT S. HANMER.

REFERENCES CITED

The following references are of record in the file of this patent:

UNITED STATES PATENTS

| Number | Name | Date |
|---|---|---|
| 2,275,312 | Tinker et al. | Mar. 3, 1942 |
| 2,349,211 | Tulleners et al. | May 6, 1944 |
| 2,394,905 | Frey | Feb. 12, 1946 |
| 2,403,879 | Schulze et al. | July 9, 1946 |
| 2,404,340 | Zimmerman | July 16, 1946 |
| 2,442,342 | Burk et al. | June 1, 1948 |